United States Patent [19]
Boschert

[11] 4,150,423
[45] Apr. 17, 1979

[54] TRANSFORMER COUPLED PASS ELEMENT

[75] Inventor: Robert J. Boschert, Sunnyvale, Calif.

[73] Assignee: Boschert Associates, Sunnyvale, Calif.

[21] Appl. No.: 834,338

[22] Filed: Sep. 19, 1977

[51] Int. Cl.² ............................................. H02M 3/335
[52] U.S. Cl. ........................................ 363/21; 363/56; 363/90; 363/97
[58] Field of Search .................... 323/6; 363/22–25, 363/27, 28, 52–57, 90, 96–98, 131–136

[56] References Cited
U.S. PATENT DOCUMENTS

| | | | |
|---|---|---|---|
| 3,777,248 | 12/1973 | Vermolen | 363/22 |
| 4,004,209 | 1/1977 | Lawson, Jr. | 363/25 X |
| 4,024,451 | 5/1977 | Nishino et al. | 363/55 X |
| 4,047,096 | 9/1977 | Madewell | 323/19 |

Primary Examiner—William M. Shoop
Attorney, Agent, or Firm—Linval B. Castle

[57] ABSTRACT

A programmable negative resistance circuit, transformer coupled to the low-voltage high-current output conductors of the center-tapped secondary winding of a switching power supply transformer, maintains a constant voltage output irrespective of large load current variations.

8 Claims, 1 Drawing Figure

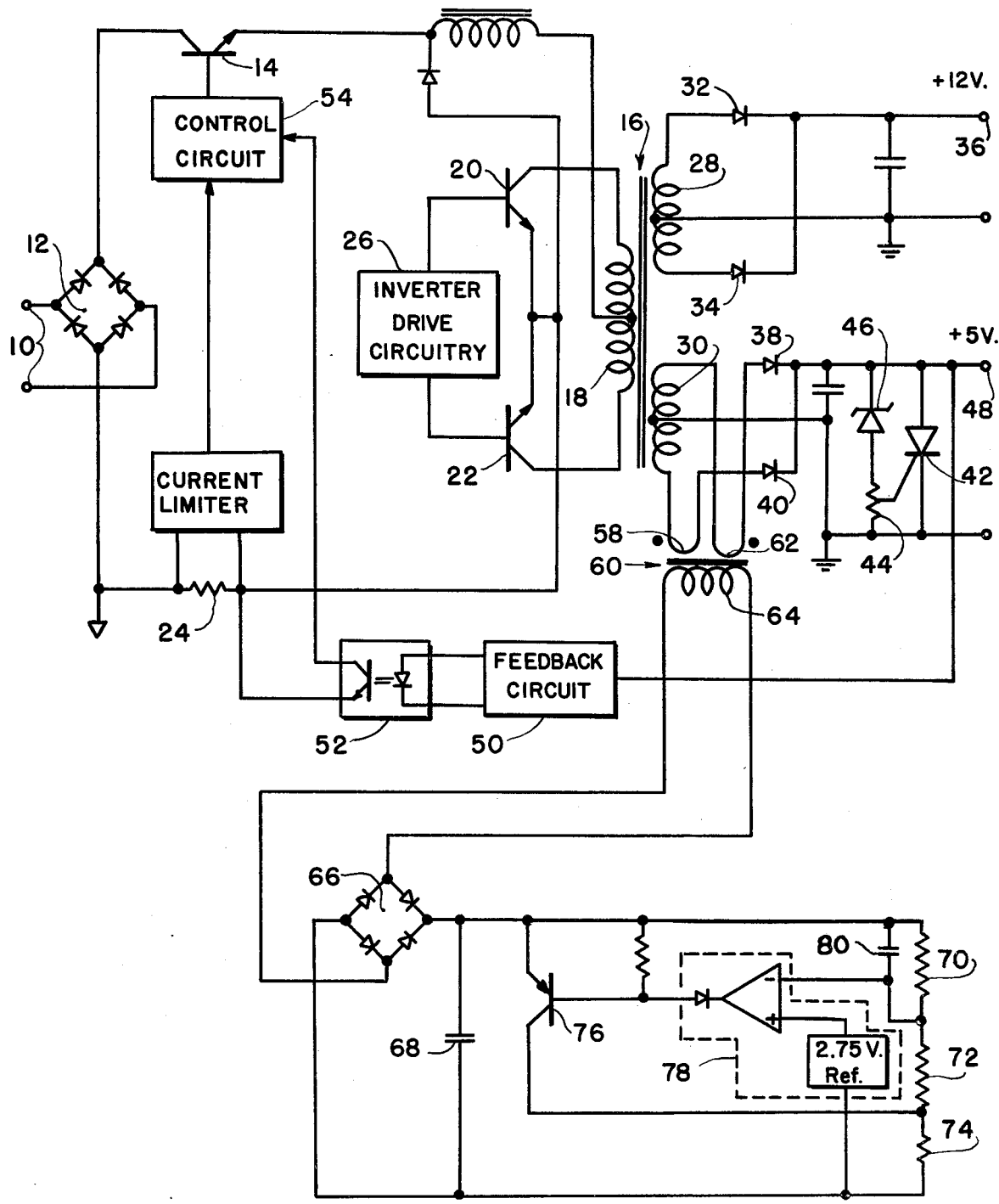

TRANSFORMER COUPLED PASS ELEMENT

SUMMARY OF THE INVENTION

This invention relates to power supply voltage regulators, and particularly to a transformer coupled pass element for maintaining a constant output voltage level irrespective of load current variations.

While the circuitry of the invention may be used for regulation of nearly all types of power supply equipment, it is particularly valuable for switching regulated power supplies, which are gaining rapid popularity because of their small size, light weight, and their high efficiency. In these regulators, alternating current is converted directly into D.C., which is then regulated by a switching regulator and applied to a D.C. converter that provides voltage translation, multiple outputs, and isolation from the A.C. line. Generally, four or more output voltages are tapped off of the secondary transformer of the D.C. to D.C. converter and one of these outputs, usually a low voltage circuit carrying the largest load current, is selected to control the operation of the regulator circuit. Such a system provides an extremely accurate regulation for various loading conditions, but primarily for the particular output that controls the switching regulator. It is apparent that large current loads will produce an IR drop in the sampled output circuit which, when sensed by the regulator control circuit, will increase the voltage in the D.C. to D.C. converter primary circuit to compensate for that drop. This increase affects all output circuits so that, while the sampled circuit will display very accurate regulation, an increased current load on that sampled circuit will result in higher voltage outputs of the remaining voltage supply circuits.

The regulator of the present invention senses the current being drawn by the power supply output circuit that preferably controls the regulator control circuit of the switching regulator power supply. The regulator of the invention includes a negative resistance circuit that lowers the voltage output with low output currents through the power supply circuit and, conversely, increases the voltage output with high output currents. The switching regulator control circuit therefore senses a voltage level that has been corrected for varying current loads, and overall regulation of the primary circuit by the switching regulator effectively corrects only for line variations and thus results in a greatly improved regulation of each of the plural outputs of the power supply.

Briefly described, the two end conductors of the center tapped secondary winding of a selected one of a plurality of power supply output circuits in the D.C. to D.C. converter of a switching regulator power supply are each coupled to a primary winding of a step-up transformer having a secondary winding that is coupled to a bridge rectifier. The transformer turns ratio is approximately 30:1 so that the voltage at the bridge rectifier is approximately thirty times the D.C. drop of the primary, and the D.C. current rectified by the bridge is about one-thirtieth the current drawn through the primary windings and to the output terminal. Because transformers such as the coupling transformer typically transform in both directions, the voltage drop in the primary winding, and therefore the D.C. output, is determined by the D.C. voltage across the rectifying bridge. This voltage is programmed by a negative resistance circuit so that the voltage is high at minimum primary currents and low at high primary currents.

BRIEF DESCRIPTION OF THE DRAWING

The single drawing of the preferred embodiment of the invention is a schematic diagram of the pass element and illustrates a negative resistance circuit transformer coupled to one output circuit of a multi-output switching regulator power supply.

DETAILED DESCRIPTION

Illustrated in the drawing is a typical switching regulator power supply having input terminals 10 coupled to a source of A.C. power. Terminals 10 are coupled to a bridge rectifier 12, one output of which is grounded and the positive output of which is applied through a current control transistor 14 to a D.C. to D.C. converter comprising a transformer 16 having a primary winding 18, the ends of which are connected to switching transistors 20 and 22. The emitters of transistors 20 and 22 are connected together and are connected to ground potential through a low resistance current sensing resistor 24. The bases of transistors 20 and 22 are connected to an inverter drive circuitry 26 which includes an oscillator circuitry operating at a frequency of approximately 20 KHz to alternately switch the transistors 20 or 22 into conduction. Transformer 16 is shown to have two output windings: one providing a 12-volt output, the second providing a 5-volt output. The secondary windings 28 and 30 have grounded center taps and the winding 28 is coupled to the anodes of rectifying diodes 32 and 34, the cathodes of which are connected together and to the 12-volt output terminal 36 of the circuit. Similarly, the winding 30 is connected to the anodes of rectifying diodes 38 and 40, the cathodes of which are connected together to the 5-volt D.C. output of the circuit.

Normally a switching regulator power supply as described above has protection devices, such as an SCR crowbar which, at a voltage above a predetermined level, shorts the output of a circuit and thereby causes the primary circuit to draw excessive current, which is sensed by a short-circuit protection circuit. In the embodiment illustrated, the over-voltage protection circuit comprises an SCR 42 coupled between ground potential and the 5-volt output. The SCR 42 is triggered by a voltage caused by a current flow through a resistance 44 in series with a Zener diode 46. Resistor 44 and Zener diode 46 are also coupled between ground potential and the 5-volt output, and the Zener 46 is selected to have a Zener voltage at a preselected level above the normal output voltage of the circuit so that upon conduction by the Zener diode 46, the resistor 44 will display an IR drop that triggers SCR 42.

Load regulation of the circuitry described above is achieved by a feedback path that samples the level of the voltage at output terminal 48 and applies that level to a feedback circuit 50 that controls the light-emitting diode of an opto-isolator 52, the intensity of which varies the current to a control circuit 54 which, in turn, controls the current conduction through transistor 14.

In the regulated power supply described above, the regulation of the 5-volt circuit which determines the regulation of the entire power supply, may be easily held to a tolerance of within 1% of rated output voltage for a 5:1 change in load. As previously mentioned, load variations on the 5-volt circuit affect the operation of the regulator in the primary side of the transformer 16 so that a high current load in the 5-volt circuit may result in an increase in voltage of the 12-volt circuit. Thus, the regulation of the 12-volt circuit and others (not shown) may be no better than plus or minus 5% of the output voltage over a 5:1 change in load. The pass element, a description of which follows, will effectively replace all voltage drop in the 5-volt circuit that is caused by increased current loads through that circuit so that the power supply may accomplish its usual regulation independently of the loading of the 5-volt circuit.

As illustrated in the drawing, one end of winding 30 of the transformer 16 is coupled through a one-turn primary winding 58 of a step-up transformer 60 before being connected to the anode of diode 40, while the other end of the secondary winding 30 is coupled through a one-turn winding 62 of the transformer 60 before being coupled to the anode of the rectifying diode 38. Transformer 60 preferably has a toroidal core wound with the secondary winding 64 of approximately thirty turns of wire. The secondary winding 30 of the transformer 16 may be designed to carry a high current, for example, in the order of 30 amperes, and the heavy conductor forming the primary windings 58 and 62 may be threaded straight through the toroidal core, but in opposite directions, as indicated by the polarity dots adjacent the windings 58 and 62 in the drawing. The winding 58 and 62, being threaded in opposite directions through the core, present to the secondary winding 64 an alternating square wave signal having a frequency of approximately 20 KHz, as determined by the chopping frequency of the inverter drive circuitry 26. The turns ratio of the transformer 60 which, in the example being presented, is 30:1 applies through the secondary winding 64 a current that is approximately one-thirtieth the current flowing in the primary windings 58 and 62 and a voltage across the winding 64 that is approximately thirty times the relatively small IR drop in series with the diodes 38 and 40.

The secondary winding 64 of the transformer 60 is connected to a full wave rectifying bridge 66, the D.C. output of which is connected across a filter capacitor 68 having a capacitance of approximately 1 microfarad. Therefore, because of the approximate 30:1 turns ratio of the transformer 60, the rectified D.C. voltage across the capacitor 68 is approximately thirty times the D.C. voltage drop through the circuitry including the secondary winding 30.

Because transformers also transform from secondary to primary, the drop in series with the diodes 38 and 40 and therefore in the D.C. output in terminal 48 is, in turn, determined by the voltage across the capacitor 68 and this capacitor voltage may be programmed so that the voltage is high at a minimum current through primary windings 58 and 62 and is low at high currents through windings 58 and 62. Thus, a circuit that will produce a rise in voltage as the load is increased, may be made to compensate the 5-volt output circuit of the power supply for IR losses caused by increased current through the winding 30 of transformer 16 and associated conductors in the circuitry.

The preferred negative resistance circuit for increasing the voltage across the capacitor 68 as a load current through the 5-volt circuit is increased includes, as illustrated in the drawing, a series resistance circuit including resistors 70, 72 and 74 connected across the capacitor 68. Resistance 70, one end of which is coupled to the positive terminal of the capacitor 68, preferably has a value of 10 kilohms, resistor 72 has a value of 910 ohms and resistor 74, which is coupled between resistor 72 and the negative side of capacitor 68, has a value of only 1.95 ohms but should be rated at approximately 5 watts. A PNP transistor 76 is included with its emitter coupled to the positive side of capacitor 68 and its collector connected to the junction between resistors 72 and 74. The base of transistor 76 is controlled by a shunt regulator 78 which, in the preferred embodiment, is a programmable shunt regulator model T1430 manufactured by Texas Instruments Company. The control terminal of the shunt regulator 78 is connected to the junction of resistors 70 and 72 and to the positive side of the capacitor 68 through a capacitor 80 which, to prevent oscillation of the circuitry, should have a value of approximately 2 microfarads.

The shunt regulator 78 includes a 2.75 volt reference, one side of which is connected to the negative side of the capacitor 68. Thus, the shunt regulator 78 monitors the voltage level at the junction of resistors 70 and 72 and controls the current flow through the transistor 76 until either the voltage across the capacitor 68 drops, or until the current flow through transistor 76 and resistor 74 increases the voltage drop across resistor 74 to the point where the voltage level at the junction of resistors 70 and 72 rises to the 2.75 volt reference level.

In operation, assume, for example, there is no load coupled to the output terminal 48 of the 5-volt power supply circuit. In such a case, there is no current passing through diodes 38 and 40 and no IR losses in the circuit including the secondary winding 30. With very little current flow through the primary windings 58 and 62 of transformer 60, there is likewise negligible current flow through the secondary winding 64 and the current output of the rectifying bridge 66 would similarly be near zero. Therefore, no current flows through transistor 76. The junction of resistors 72 and 74 is therefore at zero potential and the resistance 72 will have the 2.75 reference voltage across it. Therefore, resistor 72 will conduct a current of approximately 3 milliamperes, which also flows through the resistor 70. This current through the total resistance of resistors 70 and 72 requires an IR drop of approximately 33 volts, which is also applied across the input capacitor 68. This value, when transformed through the 30:1 transformer 60, produces in the primary winding a voltage of approximately 1.1 volts, and the minimum load output voltage at terminal 48 is lowered by this amount.

If, on the other hand, a very large current load were coupled to output terminal 48 so that the current flowing through the secondary winding 64 of the transformer 60 and the rectifying bridge 66 equaled 1.41 amperes, then a voltage of 2.75 volts will be dropped across the 1.95 ohm resistance 74. When resistor 74 has an IR drop of 2.75 volts, resistor 72 has a 0-volt drop across it so that resistors 72 and 70 carry no current. Therefore, the total voltage across the capacitor 68 will equal 2.75 volts which, by action of the bridge rectifiers, will be applied to the secondary winding 64 of the transformer 60 and transformed into the primary at a level of approximately 0.1 volts. Therefore, the full load output voltage is dropped, but by only 0.1 volts. Thus, it becomes apparent that the negative resistance circuit will effectively lower the voltage appearing at the output terminal 48 to correspond to the load applied to that terminal. When a high current load is applied to output terminal 48, the IR drop through the circuit becomes relatively large and the negative resistance circuit further drops that voltage by a negligible amount. On the other hand, when the load applied to the terminal 48 draws a low current, the IR drop through the circuit is correspondingly low and the negative resistance circuit will drop a greater voltage so that the output voltage is equalized for all loads.

It is apparent that, while the negative resistance circuit is transformed coupled to the D.C. output conductor, it operates as a current controlled series pass element in the D.C. output circuit.

Having thus described my invention, what I claim is:

1. In a power supply having an output transformer with a secondary winding coupled to rectifying means for producing a D.C. voltage to varying loads, a pass element controlled by the current to said loads for regulating the D.C. output voltage of said supply, said pass element comprising:

a second transformer having a primary winding and a secondary winding, said primary winding being coupled in series between one end of the secondary winding of the power supply output transformer and its respective rectifying means; and negative resistance circuit means coupled through a diode bridge to said second transformer secondary winding and responsive to the current flow therethrough for producing and applying across said second transformer secondary winding a D.C. voltage that linearly and inversely varies with said current flow.

2. The pass element claimed in claim 1 wherein said power supply output transformer has a center tapped secondary winding coupled to full wave rectifying means and wherein said second transformer has two primary windings coupled in series between each end of said power supply secondary winding and its respective rectifying means and in opposing polarities.

3. The pass element claimed in claim 2 wherein said step-up transformer includes a toroidal transformer core, and said two primary windings each comprise a conductor threaded through the aperture of said toroidal core, each in an opposite direction from the other.

4. The pass element claimed in claim 2 further including a capacitance coupled across said bridge rectifier at the input to said negative resistance circuit means.

5. The pass element claimed in claim 1 wherein said negative resistance circuit means includes:

a current regulating transistor coupled in series with a first resistor across said capacitance;

a second and a third resistor connected in series with said first resistor across said capacitance; and a programmable shunt regulator having input terminals coupled across said first and second resistors, said regulator output coupled to the control element of said transistor for controlling current flow through said transistor and said first resistor, said regulator adjusting said transistor current flow to obtain and maintain a predetermined reference voltage across its input terminals.

6. The pass element claimed in claim 5 further including a second capacitor coupled across said third resistor for eliminating circuit oscillation.

7. The pass element claimed in claim 5 wherein said current regulating transistor is a PNP transistor and said first resistor in series with the collector of said transistor has a resistance value of approximately two ohms.

8. The pass element claimed in claim 5 wherein said shunt regulator operates to maintain a predetermined reference voltage of 2.75 volts across its input terminals.

* * * * *